US011981970B2

(12) United States Patent
Lee et al.

(10) Patent No.: US 11,981,970 B2
(45) Date of Patent: May 14, 2024

(54) LEATHER ODOR REMOVAL COMPOSITION AND METHOD OF MANUFACTURING LEATHER WITH REDUCED ODOR USING THE SAME

(71) Applicants: Hyundai Motor Company, Seoul (KR); Kia Corporation, Seoul (KR)

(72) Inventors: Sung Hoon Lee, Gyeonggi-do (KR); Ha Young Yoon, Incheon (KR); Myoung Ryoul Lee, Seoul (KR); Seung Jin Lee, Seoul (KR); Eun Ju Noh, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 165 days.

(21) Appl. No.: 17/494,580

(22) Filed: Oct. 5, 2021

(65) Prior Publication Data

US 2022/0154298 A1 May 19, 2022

(30) Foreign Application Priority Data

Nov. 19, 2020 (KR) ........................ 10-2020-0155082

(51) Int. Cl.

| | |
|---|---|
| ***C14C 9/02*** | (2006.01) |
| ***C14C 1/04*** | (2006.01) |
| ***C14C 1/06*** | (2006.01) |
| ***C14C 3/06*** | (2006.01) |
| ***C14C 3/10*** | (2006.01) |
| ***C14C 11/00*** | (2006.01) |

(52) U.S. Cl.
CPC .................. *C14C 9/02* (2013.01); *C14C 1/04* (2013.01); *C14C 1/06* (2013.01); *C14C 3/06* (2013.01); *C14C 3/10* (2013.01); *C14C 11/00* (2013.01)

(58) Field of Classification Search
CPC .... C14C 9/02; C14C 1/04; C14C 1/06; C14C 3/06; C14C 3/10; C14C 11/00
See application file for complete search history.

(56) References Cited

U.S. PATENT DOCUMENTS 4,654,042 A * 3/1987 Willmund ................. C14C 9/02 8/94.22

FOREIGN PATENT DOCUMENTS

| | | | | |
|---|---|---|---|---|
| KR | 2019-0140165 A | | 12/2019 | |
| WO | WO 97/39632 | * | 10/1997 | ............. A01N 65/00 |
| WO | WO 03/007896 | * | 7/2002 | ........... A61K 8/8147 |

OTHER PUBLICATIONS

Covalent chemical, tallow fatty acid document, Aug. 26, 2023. https://www.covalentchemical.com/chemical-distributor/tallow-fatty-acid--low-acid-supplier-10680.aspx.*

* cited by examiner

*Primary Examiner* — Amina S Khan
(74) *Attorney, Agent, or Firm* — Fox Rothschild LLP

(57) ABSTRACT

Disclosed are a leather odor removal composition, a method of manufacturing leather with reduced odor using the same, and leather manufactured through the method. The method of reducing leather odor may include using a composition including a filler and a softening mixture.

13 Claims, 6 Drawing Sheets

LEATHER ODOR REMOVAL COMPOSITION AND METHOD OF MANUFACTURING LEATHER WITH REDUCED ODOR USING THE SAME

CROSS-REFERENCE TO RELATED APPLICATION

This application claims, under 35 U.S.C. § 119(a), the benefit of priority to Korean Patent Application No. 10-2020-0155082 filed on Nov. 19, 2020, the entire contents of which are incorporated herein by reference.

TECHNICAL FIELD

The present invention relates to a leather odor removal composition, a method of manufacturing leather with reduced odor using the same, and a leather product manufactured through the method. The method of reducing leather odor includes using a composition including a filler and a softening mixture.

BACKGROUND

In general, parts made of natural leather as well as various kinds of plastic parts and fabric parts are provided in the interior of an automobile.

The interior of the automobile is a relatively hermetically sealed environment and is limited in ventilation. For these reasons, odor in the automobile remains in the interior of the automobile for a relatively long time. In particular, intrinsic odor of natural leather may be emitted from parts having the natural leather applied thereto. For a new automobile, therefore, intrinsic odor of leather remains in the interior of the automobile for a long time. Automobile manufacturers have made a lot of efforts to reduce or remove such odor.

In general, an odor elimination method of emitting an aromatic substance having higher concentration than the odor has been reported to overpower the odor. Also, a deodorization method of reacting an odor-causing substance with another substance having high reactivity has been used, which can chemically stabilize an odor emission substance. As such, volatility of the odor-causing substance can be removed, or the odor-causing substance is changed into a third compound, thereby removing odor from the interior of the automobile.

A general deodorant is a disposable product and the deodorization effect thereof is temporary. However, odor of natural leather is not temporarily generated but is generated by a substance that is slowly and continuously volatilized for a long time. Consequently, it is difficult to achieve a complete deodorization effect through such a single deodorization operation. In the odor elimination method, an odor elimination effect for a short time is excellent, but durability thereof is low and thus a replacement cycle is short.

Therefore, attempts have been made to effectively remove odor-causing substances while not impairing intrinsic fragrance of leather instead of completely removing odor of natural leather through odor elimination or deodorization; however, research thereon is insufficient.

The above information disclosed in this Background section is provided only for enhancement of understanding of the background of the invention and therefore it may contain information that does not form the prior art that is already known in this country to a person of ordinary skill in the art.

SUMMARY

In preferred aspects, provided are a leather odor removal composition capable of continuously diffusing intrinsic fragrance of natural leather while effectively removing odor-causing substances from the natural leather, a method of removing the leather odor, and a leather product manufactured by the method.

The objects of the present invention are not limited to those described above. The objects of the present invention will be clearly understood from the following description and could be implemented by means defined in the claims and a combination thereof.

In one aspect, provided is a leather odor removal composition including a filler and a softening mixture. The softening mixture may include one or more of a first softener including fatty acid, glycerol, and glyceride, a second softener including fatty acid, glycerol, and glyceride, and a third softener including fatty acid, sterol, and glyceride.

The filler may include one or more selected from the group consisting of methanol, methylurethane, methoxybenzene, phenol, dimethyl butanedioate, 2-hydroxybenzaldehyde, dimethyl pentanedioate, naphthalene, dodecane, tridecane, tetradecane, and diphenyl ether.

The leather odor removal composition may further include an auxiliary filler. The auxiliary filler may suitably include sulfur dioxide, benzene-1-methyl-3-(3-methylphenoxy), and a mixture thereof.

The auxiliary filler may be included so as to account for 80 to 150 parts by weight based on 100 parts by weight of the filler.

The first softener may include one or more selected from the group consisting of 4-oxononanal, palmitoleic acid, oleic acid, stearic acid, glycidol stearate, monopalmitin, monolinolein, monoolein, dipalmitin, glycerol 1-palmitate 3-oleate, diolein, tripalmitin (3c 16:0), triglyceride (1C 18:0, 2C 18:1 dilinoleyl-oleyl-glycerol), and triolein (3C 18:1). The leather odor removal composition may suitably include the first softener in an amount of about 200 to 300 parts by weight based on 100 parts by weight of the filler.

The second softener may include one or more selected from the group consisting of 2-butoxyethanol, palmitic acid, palmitoleic acid, butyl carbitol, linoleic acid, oleic acid, stearic acid, dipalmitin, glycidol stearate, benzenepropanoic acid, monoolein, 2-butoxyethyl oleate, glycerol 1-palmitate 3-oleate, triglyceride (3C 16:0, tripalmitin), triglyceride (1C 18:0, 2C 18:1 dilinoleyl-oleyl-glycerol), and triglyceride (3C 18:1, triolein).

The leather odor removal composition may suitably include the second softener in an amount of about 250 to 350 parts by weight based on 100 parts by weight of the filler. The third softener may include one or more selected from the group consisting of butyrolactone, tetrahydrofuran methanol, diethylene glycol, oleic acid, benzenepropanoic acid, monoolein, campesterol, stigmasterol, sitosterol, glycerol-1-palmitate-3-oleate, and diolein.

The leather odor removal composition may suitably include the third softener in an amount of about 80 to 150 parts by weight based on 100 parts by weight of the filler.

In another aspect, provided is a method of manufacturing leather with reduced odor. The method includes washing leather, tanning the washed leather using a tanning agent, oiling the leather using the leather odor removal composition as described herein, and drying the leather.

The washing may be performed through at least one of soaking and liming.

The tanning agent may include one or more selected from the group consisting of a chrome tanning agent, a chrome-free tanning agent, and a vegetable tanning agent.

The method may further include neutralizing the leather using a counteractive after the tanning.

The method may further include painting a binder on one surface of the leather after the oiling.

The binder may include a volatile organic compound (VOC) reduction agent including a hydroxyl-amine-based compound.

The binder may suitably include the volatile organic compound reduction agent in an amount of about 15 to 25 parts by weight based on 100 parts by weight of the leather.

In a further aspect, provided is a leather with reduced odor manufactured by the method described herein.

Other aspects are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
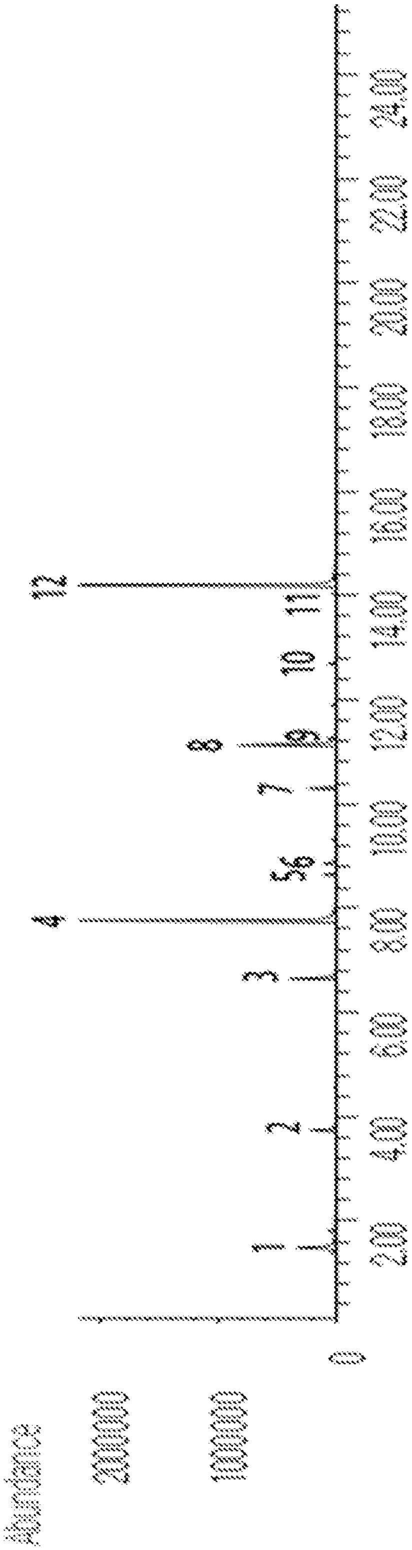
FIG. 1 shows the result of solid phase microextraction and gas chromatography-mass spectrometry (SPME-GC-MS) analysis of a filler in Manufacturing Example according to an exemplary embodiment of the present invention.
Figure 2:
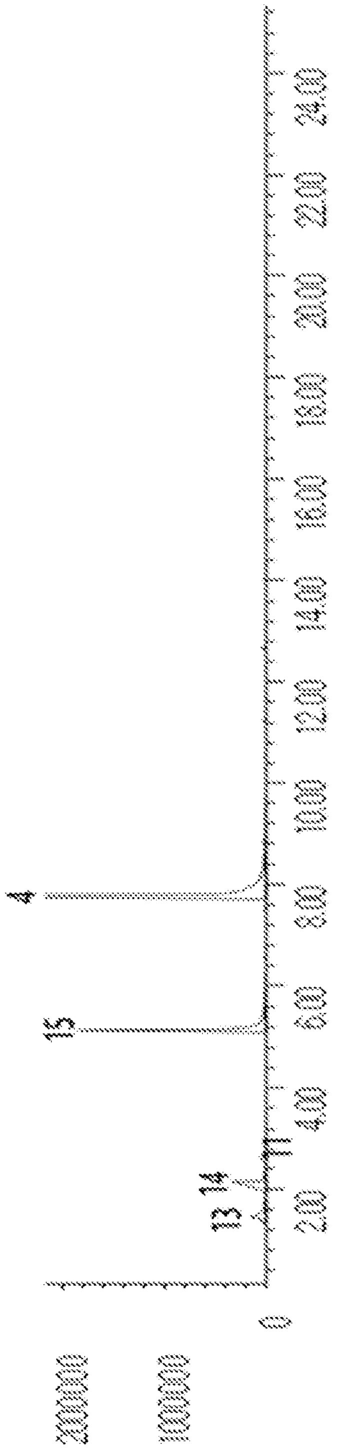
FIG. 2 shows the result of SPME-GC-MS analysis of a comparative filler in Manufacturing Example according to an exemplary embodiment of the present invention.
Figure 3:
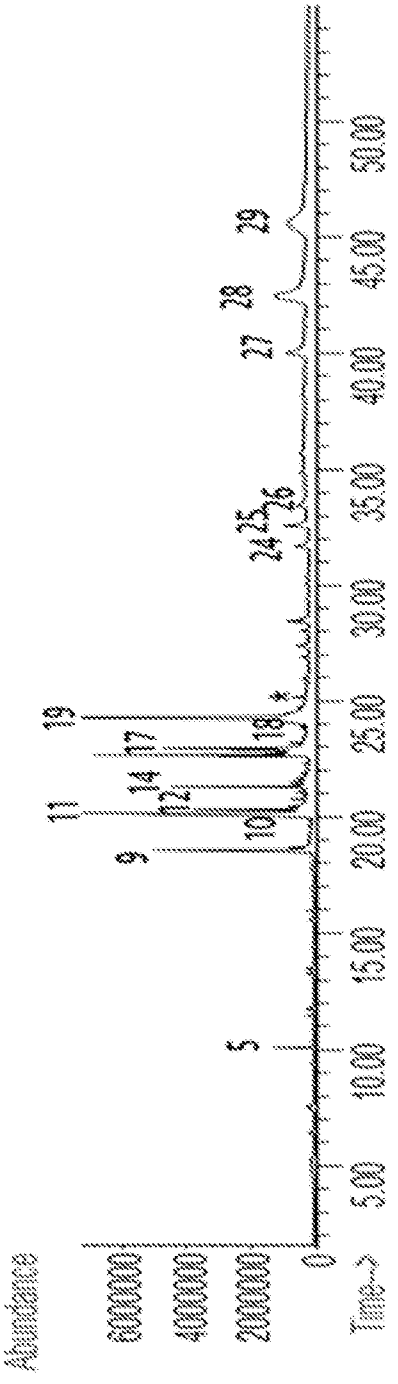
FIG. 3 shows the result of SPME-GC-MS analysis of a first exemplary softener in Manufacturing Example according to an exemplary embodiment of the present invention.
Figure 4:
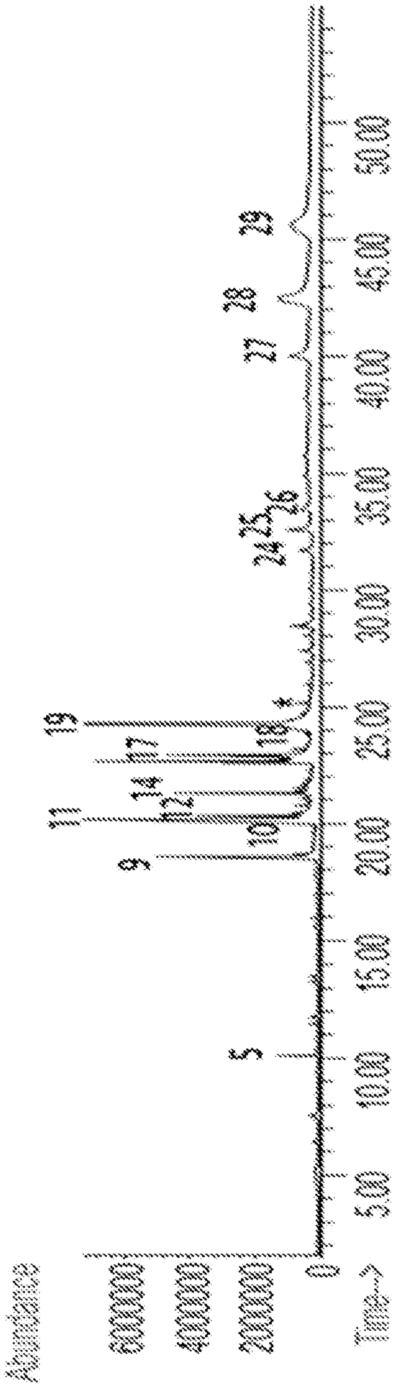
FIG. 4 shows the result of SPME-GC-MS analysis of a second exemplary softener in Manufacturing Example according to an exemplary embodiment of the present invention.
Figure 5:
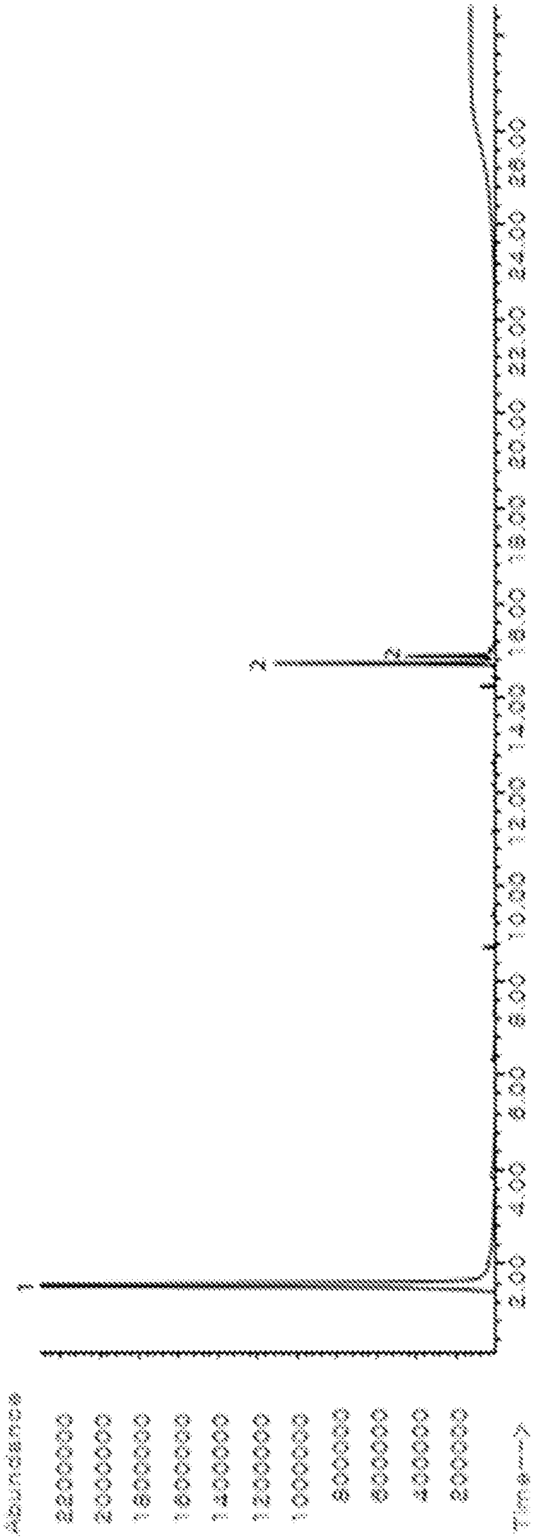
FIG. 5 shows the result of SPME-GC-MS analysis of an exemplary auxiliary filler in Manufacturing Example according to an exemplary embodiment of the present invention.
Figure 6:
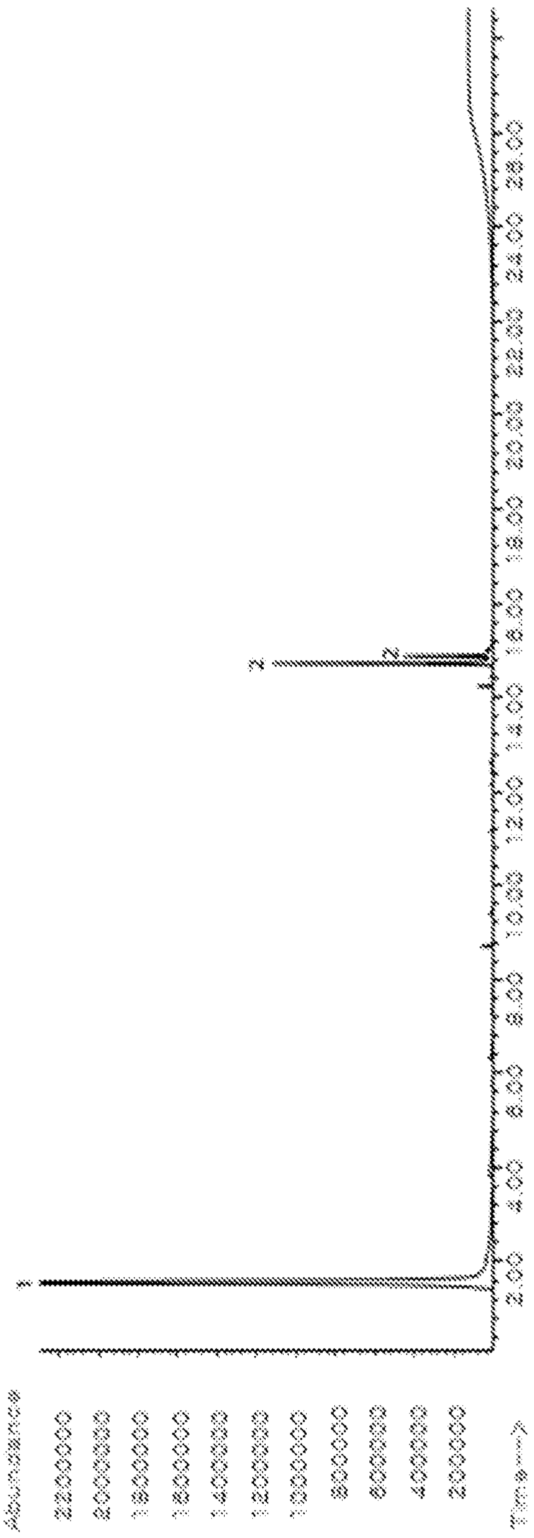
FIG. 6 shows the result of SPME-GC-MS analysis of a third exemplary softener in Manufacturing Example according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

The objects described above, and other objects, features and advantages will be clearly understood from the following preferred embodiments with reference to the attached drawings. However, the present invention is not limited to the embodiments and may be embodied in different forms. The embodiments are suggested only to offer thorough and complete understanding of the disclosed contents and sufficiently inform those skilled in the art of the technical concept of the present invention.

Like reference numbers refer to like elements throughout the description of the figures. In the drawings, the sizes of structures are exaggerated for clarity. It will be understood that, although the terms “first”, “second”, etc. may be used herein to describe various elements, corresponding elements should not be understood to be limited by these terms, which are used only to distinguish one element from another. For example, within the scope defined by the present invention, a first element may be referred to as a second element and similarly, a second element may be referred to as a first element. Singular forms are intended to include plural forms as well, unless the context clearly indicates otherwise.

It will be further understood that the terms “comprises”, “has” and the like, when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being “on” another element, it can be directly on the other element or an intervening element may also be present. It will also be understood that, when an element such as a layer, film, region or substrate is referred to as being “under” another element, it can be directly under the other element or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures among other things. For this reason, it should be understood that, in all cases, the term “about” should modify all numbers, figures and/or expressions.

Further, unless specifically stated or obvious from context, as used herein, the term “about” is understood as within a range of normal tolerance in the art, for example within 2 standard deviations of the mean. “About” can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term “about.”

In addition, when numeric ranges are disclosed in the description, these ranges are continuous and include all numbers from the minimum to the maximum including the maximum within the range unless otherwise defined. Furthermore, when the range refers to an integer, it includes all integers from the minimum to the maximum including the maximum within the range, unless otherwise defined.

It should be understood that, in the specification, when the range refers to a parameter, the parameter encompasses all figures including end points disclosed within the range. For example, the range of “5 to 10” includes figures of 5, 6, 7, 8, 9, and 10, as well as arbitrary sub-ranges such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range. In addition, for example, the range of “10% to 30%” encompasses all integers that include figures such as 10%, 11%, 12% and 13%, as well as 30%, and any sub-ranges of 10% to 15%, 12% to 18%, or 20% to 30%, as well as any figures, such as 10.5%, 15.5% and 25.5%, between appropriate integers that fall within the range.

The present invention relates to a leather odor removal composition, a method of manufacturing a leather product using the odor removal composition, and leather with reduced odor manufactured by the method described herein.

Ingredients of the leather odor removal composition according to the present invention will be described first, and then steps of the leather manufacturing method according to the present invention will be described.

Leather Odor Removal Composition

The leather odor removal composition may include a filler and a softening mixture. Preferably, the leather odor removal composition may include a filler, an auxiliary filler, and a softening mixture including at least one of a first softener, a second softener, and a third softener.

Hereinafter, the respective ingredients of the leather odor removal composition will be described.

Filler

A filler as used herein may fill mineralized leather texture and further serves to remove esters, alcohols, and aldehydes, which are odor-causing substances, from natural leather.

Particularly, the filler may suitably include one or more selected from the group consisting of methanol, methylurethane, methoxybenzene, phenol, dimethyl butanedioate, 2-hydroxybenzaldehyde, dimethyl pentanedioate, naphthalene, dodecane, tridecane, tetradecane, and diphenyl ether.

The filler may suitably include methanol, methylurethane, methoxybenzene, phenol, dimethyl butanedioate, 2-hydroxybenzaldehyde, dimethyl pentanedioate, naphthalene, dodecane, tridecane, tetradecane, and diphenyl ether. At this time, the filler may include an amount of about 2 to 10 wt % of methanol, an amount of about 1 to 5 wt % of methylurethane, an amount of about 3 to 10 wt % of methoxybenzene, an amount of about 20 to 50 wt % of phenol, an amount of about 0.1 to 3 wt % of dimethyl butanedioate, an amount of about 0.1 to 3 wt % of 2-hydroxybenzaldehyde, an amount of about 1 to 5 wt % of dimethyl pentanedioate, an amount of about 5 to 20 wt % of naphthalene, an amount of about 0.1 to 3 wt % of dodecane, an amount of about 0.1 to 3 wt % of tridecane, an amount of about 0.1 to 3 wt % of tetradecane, and an amount of about 20 to 50 wt % of diphenyl ether based on the total weight of the filler.

Auxiliary Filler

The leather odor removal composition may further include an auxiliary filler.

Particularly, the auxiliary filler may suitably include o sulfur dioxide, benzene-1-methyl-3-(3-methylphenoxy), and a mixture thereof.

The auxiliary filler may suitably include sulfur dioxide and benzene-1-methyl-3-(3-methylphenoxy). The weight ratio of sulfur dioxide to benzene-1-methyl-3-(3-methylphenoxy) may be about 1:1 to 10:1, preferably about 1:1 to 2:1.

The leather odor removal composition may suitably include the auxiliary filler in an amount of about 80 to 150 parts by weight, or particularly about 80 to 120 parts by weight, based on 100 parts by weight of the filler. When the content of the auxiliary filler is less than about 80 parts by weight, an oxidation prevention effect may be reduced, whereby a leather odor removal effect may be insufficient. When the content of the auxiliary filler is greater than about 150 parts by weight, the oxidation prevention effect may reach a predetermined level and thus the odor removal effect may be no more improved. In addition, manufacturing cost may be increased due to an increase in amount of use thereof.

Softening Mixture

A softening mixture as used herein may soften leather that may become stiff due to mineralization thereof and the filling mixture, and further serves to remove odor-causing substances that are not removed by the filling mixture from natural leather.

The softening mixture may suitably include one or more of a first softener including fatty acid, glycerol, and glyceride, a second softener including fatty acid, glycerol, and glyceride, and a third softener including fatty acid, sterol, and glyceride.

Preferably, the first softener may suitably include one or more selected from the group consisting of 4-oxononanal, palmitoleic acid, oleic acid, stearic acid, glycidol stearate, monopalmitin, monolinolein, monoolein, dipalmitin, glycerol 1-palmitate 3-oleate, diolein, tripalmitin (3C 16:0), triglyceride (1C 18:0, 2C 18:1 dilinoleyl-oleyl-glycerol), and triolein (3C 18:1).

Particularly, the first softener may suitably include an amount of about 1 to 5 wt % of 4-oxononanal, an amount of about 8 to 15 wt % of palmitoleic acid, an amount of about 15 to 20 wt % of oleic acid, an amount of about 7 to 15 wt % of stearic acid, an amount of about 13 to 20 wt % of glycidol stearate, an amount of about 8 to 15 wt % of monopalmitin, an amount of about 1 to 5 wt % of monolinolein, an amount of about 13 to 20 wt % of monoolein, an amount of about 0.5 to 3 wt % of dipalmitin, an amount of about 1 to 4 wt % of glycerol 1-palmitate 3-oleate, an amount of about 0.5 to 5 wt % of diolein, an amount of about 0.5 to 4 wt % of tripalmitin (3C 16:0), an amount of about 1.5 to 5 wt % of triglyceride (1C 18:0, 2C 18:1 dilinoleyl-oleyl-glycerol), and an amount of about 0.5 to 4 wt % of triolein (3C 18:1), based on the total weight of the first softener.

The leather odor removal composition may suitably include the first softener in an amount of about 200 to 300 parts by weight, or particularly of about 210 to 290 parts by weight, based on 100 parts by weight of the filler. When the content of the first softener is less than about 200 parts by weight, leather may be dry and stiff, whereby tensile strength and elongation thereof may be reduced. When the content of the first softener is greater than about 300 parts by weight, leather may be dry and stiff, a loose grain problem in which bonding between a grain layer and a dermal layer of leather becomes weak may occur, whereby an adverse effect may be caused in connection with leather wrinkles.

The second softener as used herein may remove odor-causing substances and further may provide fullness and smooth touch to leather.

The second softener may suitably include 2-butoxyethanol, palmitic acid, palmitoleic acid, butyl carbitol, linoleic acid, oleic acid, stearic acid, cholesterol, glycidol stearate, benzenepropanoic acid, monoolein, 2-butoxyethyl oleate, glycerol 1-palmitate 3-oleate, triglyceride (3C 16:0, tripalmitin), triglyceride (1C 18:0, 2C 18:1 dilinoleyl-oleyl-glycerol), and triglyceride (3C 18:1, triolein).

The second softener may suitably include an amount of about 2 to 5 wt % of 2-butoxyethanol, an amount of about 5 to 15 wt % of palmitic acid, an amount of about 0.5 to 5 wt % of palmitoleic acid, an amount of about an amount of about 14 to 20 wt % of butyl carbitol, an amount of about 0.1 to 3 wt % of linoleic acid, an amount of about 14 to 20 wt % of oleic acid, an amount of about 3 to 10 wt % of stearic acid, an amount of about 0.5 to 3 wt % of cholesterol, an amount of about 3 to 8 wt % of glycidol stearate, an amount of about 3 to 8 wt % of benzenepropanoic acid, an amount of about 2 to 7 wt % of monoolein, an amount of about 2 to 7 wt % of 2-butoxyethyl oleate, an amount of about 0.5 to 3 wt % of glycerol 1-palmitate 3-oleate, an amount of about 2 to 7 wt % of triglyceride (3C 16:0, tripalmitin), an amount of about 5 to 14 wt % of triglyceride (1C 18:0, 2c 18:1 dilinoleyl-oleyl-glycerol), and an amount of about 1 to 5 wt % of triglyceride (3C 18:1, triolein) based on the total weight of the second softener.

The leather odor removal composition may suitably include the second softener in an amount of about 250 to 350 parts by weight, or particularly, about 235 to 320 parts by weight, based on 100 parts by weight of the filler. When the content of the second softener is less than about 250 parts by weight, leather may be dry and stiff, whereby tensile strength and elongation thereof may be reduced. When the content of the second softener is greater than about 350 parts by weight, force of attachment between the second softener and painting chemicals at a painting shop may be reduced due to an oily property thereof.

The third softener as used herein may reduce odor that is continuously generated in a finished leather product as well as in a leather dyeing process.

The third softener may suitably include one or more selected from the group consisting of butyrolactone, tetrahydrofuran methanol, diethylene glycol, oleic acid, benzenepropanoic acid, campesterol, stigmasterol, sitosterol, glycerol-1-palmitate-3-oleate, diolein, and a combination thereof, and preferably includes butyrolactone, tetrahydrofuran methanol, diethylene glycol, oleic acid, benzenepropanoic acid, campesterol, stigmasterol, sitosterol, glycerol-1-palmitate-3-oleate, and diolein.

Particularly, the third softener may suitably include an amount of about 1 to 6 wt % of butyrolactone, an amount of about 10 to 20 wt % of tetrahydrofuran methanol, an amount of about 2 to 9 wt % of diethylene glycol, an amount of about 1 to 6 wt % of oleic acid, an amount of about 45 to 66 wt % of Irganox 1135, an amount of about 0.5 to 4 wt % of campesterol, an amount of about 0.3 to 3 wt % of stigmasterol, an amount of about 2 to 9 wt % of sitosterol, an amount of about 1 to 6 wt % of glycerol-1-palmitate-3-oleate, and an amount of about 1 to 6 wt % of diolein based on the total weight of the third softener.

The leather odor removal composition may suitably include the third softener in an amount of about 80 to 150 parts by weight, or particularly about 80 to 120 parts by weight, based on 100 parts by weight of the filler. When the content of the third softener is less than about 80 parts by weight, an oxidation prevention effect may be reduced, whereby a leather odor removal effect may be insufficient. When the content of the third softener is greater than about 150 parts by weight, leather may be too softened, whereby fullness may be lost and loose grain may be generated.

Method of Manufacturing Leather with Reduced Odor

A method of manufacturing a leather product with reduced odor includes a step of washing leather, a step of tanning the washed leather using a tanning agent, a step of oiling the leather using a leather odor removal composition described herein, and a step of drying the leather.

Hereinafter, the respective steps will be described in detail.

Washing Step

The method includes a step of washing prepared leather fabric to remove salt, dust, and the like therefrom. The prepared leather fabric may or may not be preserved with a salt, which may be selected as needed.

The washing may be performed through at least one of soaking and liming.

The soaking process may be a process of soaking leather in water such that the leather reabsorbs moisture in order to restore the leather to a soft state and to remove filth, salt, protein, etc. from the surface of the leather.

In the liming process, sodium sulfide ($Na_2S$), sodium hydrosulfide (NaSH), or calcium hydroxide ($Ca(OH)_2$) may be used. It is possible to remove fur and unnecessary protein from the surface of leather using such an alkali chemical.

Tanning Step

In the tanning step, heat resistance, decomposition resistance, flexibility, and elasticity may be provided to leather while the structure of leather is stabilized through chemical bonding of protein in the leather using a tanning agent.

The tanning agent may include one or more selected from the group consisting of a chrome tanning agent, a chrome-free tanning agent, and a vegetable tanning agent.

After the tanning step, a step of neutralizing the leather using a counteractive may be performed as needed.

Neutralization may be a process of increasing hydrogen ion concentration (pH) inside and outside the leather.

In general, after the tanning step, hydrogen ion concentration (pH) may be reduced to about 4 or less as the result of tanning, whereby the entire leather may be acidified. In this case, it may be difficult for a dye or the leather odor removal composition according to the present invention to permeate the leather at the time of dyeing or oiling. That is, the dye or the leather odor removal composition according to the present invention easily permeates the leather and is easily bonded to the leather through neutralization.

Oiling Step

The method includes a step of oiling the leather using the leather odor removal composition according to the present invention.

A separately prepared dye may be introduced into the leather together with the leather odor removal composition in order to provide a desired color to the leather in the oiling step as needed.

The leather odor removal composition as described herein includes a filler and a softening mixture including at least one of a first softener, a second softener, and a third softener. At this time, the leather odor removal composition may suitably may include the filler in an amount of about 1 to 3 parts by weight, or particularly in an amount of about 1.5 to 2.5 parts by weight, based on 100 parts by weight of the leather.

The leather odor removal composition is identical to the previously described leather odor removal composition, and a duplicate description thereof will be omitted.

In the present invention, a painting step of painting a binder on one surface of the leather may be further performed after the oiling step.

The binder may suitably include one selected from the group consisting of a phosphorus-based binder, an acrylic binder, a urethane binder, and a combination thereof.

The binder may include a volatile organic compound (VOC) reduction agent including a hydroxyl-amine-based compound.

An odor reduction effect may be improved in the case in which the binder includes a predetermined content of the volatile organic compound reduction agent. Preferably, the binder may suitably include volatile organic compound reduction agent in an amount of about 15 to 25 parts by weight, or particularly about 18 to 23 parts by weight, based on 100 parts by weight of the leather. When the content of the volatile organic compound reduction agent is less than about 15 parts by weight, an odor removal effect may not be great. When the content of the volatile organic compound reduction agent is greater than about 25 parts by weight, an odor removal effect may be great, but the leather bonding performance of the binder may be reduced and a leather production yield may be reduced.

Drying Step

In the drying step, the leather is dried using a vacuum dryer.

The drying step is not particularly restricted, and any drying method belonging to the same technical field may be used.

EXAMPLE

Hereinafter, the present invention will be described in more detail with reference to examples. However, the following examples are merely an illustration to assist in understanding the present invention, and the present invention is not limited by the following examples.

Manufacturing Example

A filler, an auxiliary filler, a comparative filler, a first softener, a second softener, and a third softener to be used for experiments were prepared, and ingredients of each material were inspected through SPME-GC-MS analysis.

FIGS. 1 to 6 are graphs showing the results of analysis of the compositions used in Example and Comparative Example using solid phase microextraction and gas chromatography-mass spectrometry (SPME-GC-MS), and Tables 1 to 6 below show ingredients detected through the above analysis. FIG. 1 and Table 1 show the result of analysis of a filler to be used in Example, FIG. 2 and Table 2 show the result of analysis of a comparative filler to be used in Comparative Example, FIG. 3 and Table 3 show the result of analysis of a first softener to be used in Example and Comparative Example, FIG. 4 and Table 4 show the result of analysis of a second softener to be used in Example and Comparative Example, FIG. 5 and Table 5 show the result of analysis of an auxiliary filler to be used in Example and Comparative Example, and FIG. 6 and Table 6 show the result of analysis of a third softener to be used in Example and Comparative Example.

TABLE 1

| Number | Ingredient | Content (wt %) |
|---|---|---|
| 1 | Methanol | 4.4 |
| 2 | Methylurethane | 3.5 |
| 3 | Methoxybenzene | 5.5 |
| 4 | Phenol | 31.9 |
| 5 | Dimethyl butanedioate | 1.6 |
| 6 | 2-Hydroxybenzaldehyde | 1.4 |
| 7 | Dimethyl pentanedioate | 3.8 |
| 8 | Naphthalene | 12.0 |
| 9 | Dodecane | 1.1 or less |
| 10 | Tridecane | 1.1 or less |
| 11 | Tetradecane | 1.1 or less |
| 12 | Diphenyl ether | 32.6 |

TABLE 2

| Number | Ingredient | Content (wt %) |
|---|---|---|
| 1 | Phenol | 49.1 |
| 2 | Sulfur dioxide | 4.9 |
| 3 | Acetic acid | 6.4 |
| 4 | Furfural | 39.6 |

TABLE 3

| Number | Ingredient | Content (wt %) |
|---|---|---|
| 1 | 4-Oxononanal | 2.5 |
| 2 | Palmitic acid | 11.6 |
| 3 | Oleic acid | 17.1 |
| 4 | Stearic acid | 10.6 |
| 5 | Glycidol stearate | 16.5 |
| 6 | Monopalmitin | 11.1 |
| 7 | Monolinolein | 2.5 |
| 8 | Monoolein | 16.3 |
| 9 | Cholesterol à Dipalmitin | 1.3 |
| 10 | Glycerol 1-palitate 3-oleate | 2.1 |
| 11 | Diolein | 1.8 |
| 12 | Tripalmitin | 2.0 |
| 13 | Triglyceride à Dilinoleoyl-oleoyl-glycerol | 2.7 |
| 14 | Triolein | 2.0 |

TABLE 4

| Number | Ingredient | Content (wt %) |
|---|---|---|
| 1 | 2-Butoxyethanol | 3.9 |
| 2 | Butyl carbitol | 17.8 |
| 3 | Palmitoleic acid | 2.0 |
| 4 | Palmitic acid | 10.5 |
| 5 | Linoleic acid | 0.9 |
| 6 | Oleic acid | 17.2 |
| 7 | Stearic acid | 7.7 |
| 8 | Glycidol stearate | 5.3 |
| 9 | Irganox 1135 | 5.4 |
| 10 | Monoolein | 4.9 |
| 11 | 2-Butoxyethyl oleate | 4.9 |
| 12 | Cholesterol à Dipalmitin | 1.3 |
| 13 | Glycerol 1-palmitate 3-oleate | 1.6 |
| 14 | Tripalmitin | 4.7 |
| 15 | Triglyceride à Dilinoleoyl-oleoyl-glycerol | 9.1 |
| 16 | Triolein | 2.7 |

TABLE 5

| Number | Ingredient | Content (wt %) |
|---|---|---|
| 1 | Sulfur dioxide | 59.1 |
| 2 | Benzene, 1-methyl-3-(3-methylphenoxy) | 40.9 |

TABLE 6

| Number | Ingredient | Content (wt %) |
|---|---|---|
| 1 | Butyrolactone | 3.9 |
| 2 | Tetrahydro-furanmethanol | 14.4 |
| 3 | Diethylene glycol | 5.0 |
| 4 | Oleic acid | 4.1 |
| 5 | Irganox 1135 | 56.2 |
| 6 | Campesterol | 2.1 |
| 7 | Stigmasterol | 1.7 |
| 8 | Sitosterol | 5.0 |
| 9 | Glycerol 1-palmitate 3-oleate | 3.8 |
| 10 | Diolein | 3.8 |

Example 1 and Comparative Examples 1 to 11

Compositions were prepared so as to include ingredients shown in Tables 7 and 8 below and were applied to tanned leather.

(In Example and Comparative Examples, the same processes were performed except that the compositions had different ingredients and contents.)

TABLE 7

| | Example 1 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Filler* (Parts by weight) | 100 | 0 | 100 | 100 | 100 | 100 | 100 | 100 |
| Comparative Filler (Parts by weight) | 0 | 100 | 0 | 0 | 0 | 0 | 0 | 0 |
| Auxiliary Filler (Parts by weight) | 120 | 120 | 50 | 120 | 170 | 120 | 120 | 120 |
| First softener (Parts by weight) | 250 | 250 | 250 | 250 | 250 | 150 | 250 | 400 |
| Second softener (Parts by weight) | 275 | 275 | 275 | 275 | 275 | 200 | 200 | 125 |
| Third softener (Parts by weight) | 100 | 100 | 100 | 50 | 50 | 100 | 100 | 100 |

*Filler was included so as to account for 2 parts by weight based on 100 parts by weight of leather.

TABLE 8

| | Comparative Example 8 | Comparative Example 9 | Comparative Example 10 | Comparative Example 11 |
|---|---|---|---|---|
| Filler* (Parts by weight) | 100 | 100 | 100 | 100 |
| Comparative Filler (Parts by weight) | 0 | 0 | 0 | 0 |
| Auxiliary Filler (Parts by weight) | 120 | 120 | 50 | 50 |
| First softener (Parts by weight) | 150 | 150 | 250 | 150 |
| Second softener (Parts by weight) | 275 | 400 | 275 | 200 |
| Third softener (Parts by weight) | 100 | 100 | 50 | 50 |

*Filler was included so as to account for 2 parts by weight based on 100 parts by weight of leather.

Experimental Example 1 (Analysis of Emission Amounts of Odor Ingredients of Natural Leather Samples)

Leather samples oiled using the compositions according to Example 1 and Comparative Examples 1 to 11 were dried, and odor emission amounts thereof were analyzed. The results are shown in Tables 9 and 10 below.

TABLE 9

| Classification | Recommended value | Example 1 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| A | 330 or less | 22 | 146 | 843 | 894 | 789 | 453 | 35 | 18 |
| B | 200 or less | 3 | 39 | 64 | 3433 | 3243 | 584 | 531 | 704 |
| C | 1000 or less | 2699 | 5358 | 6244 | 7354 | 6985 | 2835 | 2621 | 2810 |
| D | 150 or less | 92 | 229 | 137 | 210 | 187 | 221 | 274 | 405 |
| E | 1000 or less | 577 | 1422 | 1149 | 977 | 802 | 590 | 607 | 612 |
| F | 25 or less | 61 | 38 | 55 | 62 | 59 | 187 | 52 | 34 |
| Total | 10000 or less | 3454 | 7232 | 8486 | 12930 | 12065 | 4870 | 4120 | 4583 |

* Unit (μg/m$^3$) * A (butyl acetate), B (2-butoxyethanol), C (propionaldehyde), D (valeraldehyde), E (hexyl aldehyde), and F (methacrolein)

TABLE 10

| Classification | Recommended value | Comparative Example 8 | Comparative Example 9 | Comparative Example 10 | Comparative Example 11 |
|---|---|---|---|---|---|
| A | 330 or less | 428 | 486 | 1566 | 2044 |
| B | 200 or less | 37 | 7 | 3617 | 4059 |
| C | 1000 or less | 2542 | 2725 | 9840 | 10077 |
| D | 150 or less | 88 | 59 | 242 | 420 |

TABLE 10-continued

| Classification | Recommended value | Comparative Example 8 | Comparative Example 9 | Comparative Example 10 | Comparative Example 11 |
|---|---|---|---|---|---|
| E | 1000 or less | 521 | 580 | 1576 | 1444 |
| F | 25 or less | 177 | 161 | 45 | 201 |
| Total | 10000 or less | 3793 | 4018 | 16886 | 18245 |

* Unit (μg/m$^3$) * A (butyl acetate), B (2-butoxyethanol), C (propionaldehyde), D (valeraldehyde), E (hexyl aldehyde), and F (methacrolein)

Experimental Example 2 (Measurement of Effect of Volatile Organic Compound Reduction Agent)

The leather sample oiled using the odor removal composition manufactured according to Example 1 was further painted. At this time, a hydroxylamine-based VOC reduction agent was applied to a binder while having different contents as shown in Table 11 below. The results are shown in FIG. 12 below.

TABLE 11

| Classification | Example 1 | Example 2 | Example 3 | Example 4 | Comparative Example 12 |
|---|---|---|---|---|---|
| VOC reduction agent | 0 parts by weight | 4 parts by weight | 12 parts by weight | 20 parts by weight | 30 parts by weight |

* Content was based on 100 parts by weight of leather.

TABLE 12

| Odor ingredient | Example 1 | Example 2 | Example 3 | Example 4 | Comparative Example 12 |
|---|---|---|---|---|---|
| A | 22 | 58 | 65 | 57 | 13 |
| B | 3 | 11 | 9 | 10 | 1 |
| C | 2699 | 3313 | 3509 | 1440 | 521 |
| D | 92 | 103 | 124 | 37 | 0 |
| E | 577 | 616 | 707 | 204 | 30 |
| F | 61 | 83 | 122 | 53 | 99 |

* Content was based on 100 parts by weight of leather.

* A (butyl acetate), B (2-butoxyethanol), C (propionaldehyde), D (valeraldehyde), E (hexyl aldehyde), and F (methacrolein)

In Example 2 and Example 3, in which 4 parts by weight of the VOC reduction agent and 12 parts by weight of the VOC reduction agent were used, respectively, effects were not greater than in Example 1, in which no VOC reduction agent was used. In contrast, in Example 4, in which 20 parts by weight of the VOC reduction agent was used, propionaldehyde, valeraldehyde, and hexyl aldehyde were considerably reduced. In Comparative Example 12, in which 30 parts by weight of the VOC reduction agent was used, odor ingredients were the most greatly reduced. However, it was difficult to secure a sufficient leather production yield due to excessive content thereof, and the performance of a leather bonding layer was reduced, whereby the leather was not properly coated.

According to various exemplary embodiments of the present invention, it is possible to provide a leather odor removal composition capable of continuously diffusing intrinsic fragrance of natural leather while effectively removing odor-causing substances from the natural leather.

The effects of the present invention are not limited to those mentioned above. It should be understood that the effects of the present invention include all effects that can be inferred from the foregoing description of the present invention.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A leather odor removal composition comprising:

a filler comprising diphenyl ether; and a softening mixture, wherein the softening mixture comprises a first softener comprising fatty acid, glycerol, and glyceride, a second softener comprising fatty acid, glycerol, and glyceride, a third softener comprising fatty acid, sterol, and glyceride, and an auxiliary filler comprising sulfur dioxide, wherein the first softener comprises oleic acid, wherein the second softener comprises butyl carbitol, wherein the third softener comprises benzenepropanoic acid, wherein the leather odor removal composition comprises the auxiliary filler in an amount of about 80 to 150 parts by weight based on 100 parts by weight of the filler, wherein the leather odor removal composition comprises the first softener in an amount of about 200 to 300 parts by weight based on 100 parts by weight of the filler, wherein the leather odor removal composition comprises the second softener in an amount of about 250 to 350 parts by weight based on 100 parts by weight of the filler, wherein the leather odor removal composition comprises the third softener in an amount of about 80 to 150 parts by weight based on 100 parts by weight of the filler.

2. The leather odor removal composition according to claim 1, wherein the filler further comprises one or more selected from the group consisting of methanol, methylurethane, methoxybenzene, phenol, dimethyl butanedioate, 2-hydroxybenzaldehyde, dimethyl pentanedioate, naphthalene, dodecane, tridecane, and tetradecane.

3. The leather odor removal composition according to claim 1, wherein the auxiliary filler further comprises benzene-1-methyl-3-(3-methylphenoxy).

4. The leather odor removal composition according to claim 1, wherein the first softener further comprises one or more selected from the group consisting of 4-oxononanal, palmitoleic acid, stearic acid, glycidol stearate, monopalmitin, monolinolein, monoolein, dipalmitin, glycerol 1-palmitate 3-oleate, diolein, tripalmitin (3c 16:0), triglyceride (1C 18:0, 2C 18:1 dilinoleyl-oleyl-glycerol), and triolein (3C 18:1).

5. The leather odor removal composition according to claim 1, wherein the second softener further comprises one or more selected from the group consisting of 2 butoxyethanol, palmitic acid, palmitoleic acid, butyl carbitol, linoleic acid, oleic acid, stearic acid, dipalmitin, glycidol stearate, benzenepropanoic acid, monoolein, 2-butoxyethyl oleate, glycerol 1-palmitate 3-oleate, triglyceride (3C 16:0, tripalmitin), triglyceride (IC 18:0, 2C 18:1 dilinoleyl-oleyl-glycerol), and triglyceride (3C 18:1, triolein).

6. The leather odor removal composition according to claim 1, wherein the third softener further comprises one or more selected from the group consisting of one selected from a group consisting of butyrolactone, tetrahydrofuran methanol, diethylene glycol, oleic acid, campesterol, stigmasterol, sitosterol, glycerol-1-palmitate-3-oleate, and diolein.

7. A method of manufacturing a leather product, comprising:

washing a leather;

tanning the washed leather using a tanning agent;

oiling the leather using a leather odor removal composition according to claim 1; and drying the leather.

8. The method according to claim 7, wherein the washing is performed through at least one of soaking and liming.

9. The method according to claim 7, wherein the tanning agent comprises one or more selected from the group consisting of a chrome tanning agent, a chrome-free tanning agent, a vegetable tanning agent and a combination thereof.

10. The method according to claim 7, further comprising painting a binder on one surface of the leather after the oiling.

11. The method according to claim 10, wherein the binder comprises a volatile organic compound (VOC) reduction agent comprising a hydroxyl-amine-based compound.

12. The method according to claim 11, wherein the binder comprises the volatile organic compound reduction agent in an amount of about 15 to 25 parts by weight based on 100 parts by weight of the leather.

13. A leather product manufactured by a method according to claim 7.

* * * * *